United States Patent [19]

Carmen

[11] 3,999,264
[45] Dec. 28, 1976

[54] AUTOMATIC TURRET HEAD

[75] Inventor: Bruce Wayne Carmen, South Bend, Ind.

[73] Assignee: South Bend Lathe, Inc., South Bend, Ind.

[22] Filed: Sept. 25, 1974

[21] Appl. No.: 509,011

[52] U.S. Cl. ............................ 29/48.5 R; 74/826
[51] Int. Cl.² .................................. B23B 7/04
[58] Field of Search .......... 74/826, 821; 29/48.5 R, 29/42, 49; 82/36 R

[56] References Cited
UNITED STATES PATENTS

| | | | |
|---|---|---|---|
| 2,934,978 | 5/1960 | Estabrook | 74/821 X |
| 3,049,032 | 8/1962 | Schabot | 74/826 X |
| 3,054,333 | 9/1962 | Brainard et al. | 74/826 X |
| 3,137,916 | 6/1964 | Leafquist et al. | 74/826 X |
| 3,545,317 | 12/1970 | Shultz et al. | 74/826 X |
| 3,593,597 | 7/1971 | Jennings | 74/821 X |
| 3,653,282 | 4/1972 | Bouffiou et al. | 74/821 X |
| 3,717,912 | 2/1973 | Lahm | 74/826 X |
| 3,782,226 | 1/1974 | Boyd et al. | 74/826 X |
| 3,861,245 | 1/1975 | Vauch et al. | 74/826 |

Primary Examiner—Othell M. Simpson
Assistant Examiner—W. R. Briggs
Attorney, Agent, or Firm—Craig & Antonelli

[57] ABSTRACT

An automatic tool turret for a lathe including a base adapted to be detachably secured to the lathe way. A tool carrying head is mounted on the base for movement between a clutched work performing position and unclutched head rotating position. The movement is hydraulically accomplished so that the head is supported by a hydrostatic bearing created by the hydraulic fluid. The fluid pressures generated during the movement of the head between its clutched and unclutched positions is used to initiate a work performing operation and to initiate turning of the head.

35 Claims, 8 Drawing Figures

AUTOMATIC TURRET HEAD

BACKGROUND AND SUMMARY OF THE INVENTION

The present invention relates to a tool holder and more particularly to a rotatable tool holding turret of the type adapted for use with a lathe or the like.

Tool turrets of the foregoing type generally include a base which is suitably located and attached to the lathe way. A turret head having a plurality of radially extending and angularly spaced tools mounted therein is supported on the base. The turret head is mounted for turning on the base in an unclamped or unclutched position to a clamped or clutched position in which a selective one of the tools is located in an operative work performing position. Such movement may be automatically accomplished by means of a numerical control system.

By the present invention it is proposed to provide a tool holding turret of the foregoing type having an improved arrangement for turning and clamping the turret head to the different work performing positions.

This is accomplished by a tool holding turret comprising generally a base having a clutch surface and a hydraulic chamber. A turret head is mounted on the base and is formed with a clutch surface complmentary to the base clutch surface. A piston means is attached to the turret head and has a piston head slidably disposed in the hydraulic chamber so that upon the controlled introduction of hydraulic fluid therein, the head is moved between a clutched and unclutched position. The ports through which the fluid flows into and out of the chamber are located so that the piston head serves as a hydrostatic and hydrodynamic bearing in the unclamped position thereof. A hydraulically actuated mechanical means is provided for rotating the head relative to the base when the head is in the unclamped position thereby to selectively position one of the tools carried by the turret head into a work performing position.

To permit the replacement of different tools, the head is formed with a separable tool holding section and clutch surface sections are maintained in alignment by aligning pins. A rubber bushed pin absorbs the energy imposed on the turret internal mechanism when the head and tools are stopping and starting when selectively positioning one of the tools carried by the turret head into a work performing position.

As a further feature of the present invention the clutching surfaces are formed as precision ground serated teeth of substantially rectangular cross section. The clutching surfaces are protected by overlapping skirt means disposed radially outwardly of the surfaces thereby to provide in the nature of a labyrinth seal in both the clutched and unclutched positions of the turret head.

Further features of the invention will hereinafter appear.

DESCRIPTION OF THE PREFERRED EMBODIMENT

Referring now to the drawings the automatic tool turret 10 comprises generally a base 11 and turret head 12 rotatably mounted thereon. The base 11 may be in the form of a generally rectangular or square block including a base plate 13 having a dove tail groove 14 which is adapted to receive the way of a lathe. The inner or upper surface of the base plate 13 is provided with an annular depression which receives a peripheral flange 16 along the inner edge defining a circular recess 18 in an upper plate 17. When thus seated on the base plate 13, the upper recess 18 defines a piston chamber into which hydraulic fluid such as oil or the like is introduced as more fully to be explained hereinafter. An O-ring 19 is disposed between the upper and base plates 17 and 13 respectively to provide a fluid seal.

Figures 7, 8:
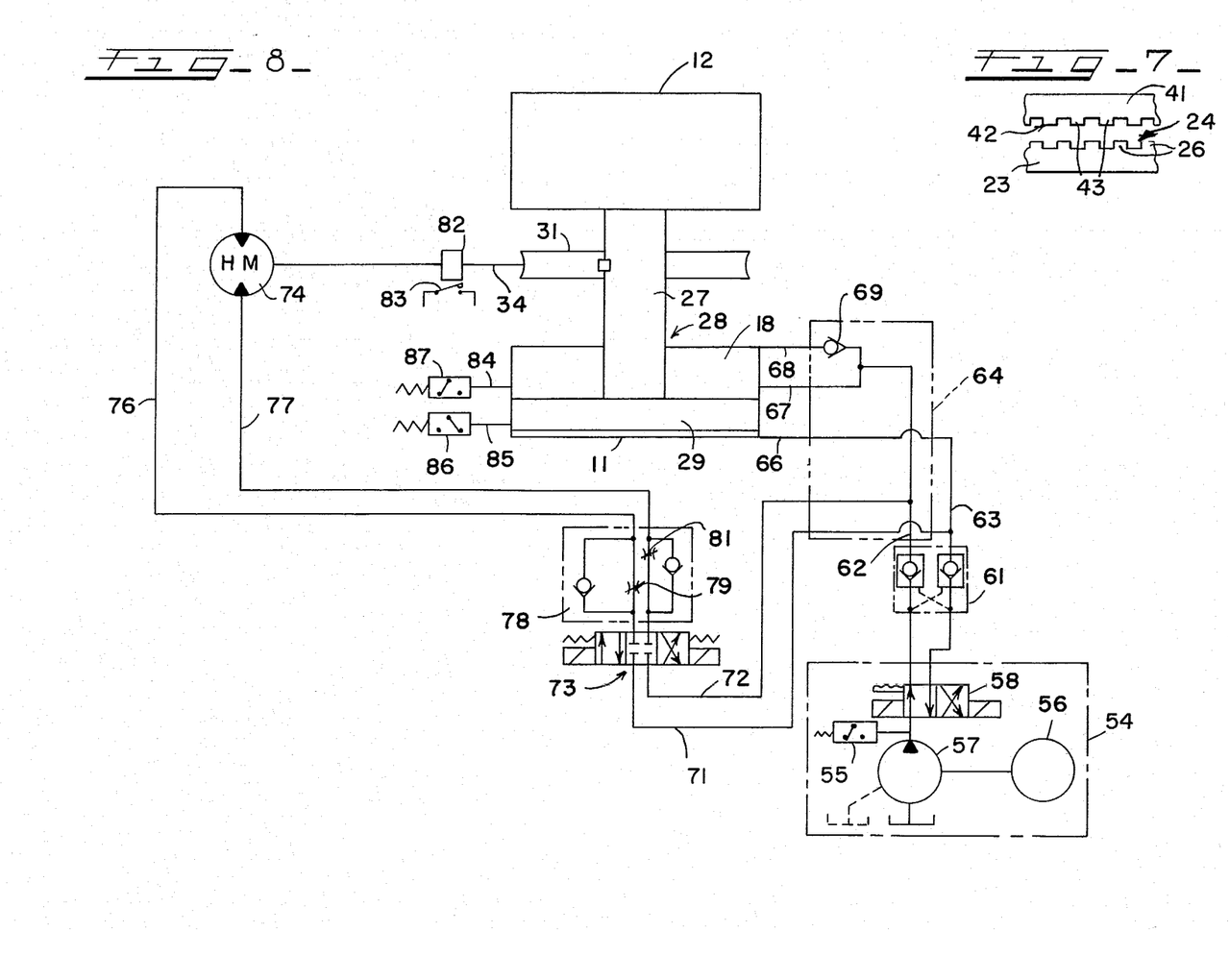
FIG. 7 is a cross sectional view taken generally along the lines 7—7 of FIG. 4 showing the clutching surfaces on the base and turret head in the uncoupled position.
FIG. 8 is a schematic diagram of the tool turret and the actuating system therefore.

The upper face of the upper plate 17 is formed with an upper cylindrical recess 21 having a shoulder 22 on which there is seated an annular clutch or coupling plate 23. The clutch plate 23 is formed with an annular clutching surface 24 comprising a plurality of angularly spaced and radially extending teeth 26 of substantially rectangular cross section as shown in FIG. 7.

The annular clutch plate 23 slidably accommodates a piston shaft 27 of a piston means 28 in an axially located and bushed opening in the plate 23. A piston head 29 on one end of the shaft is disposed within the chamber 18 and is vertically displaceable therein as more fully to be explained hereinafter.

Figure 5:
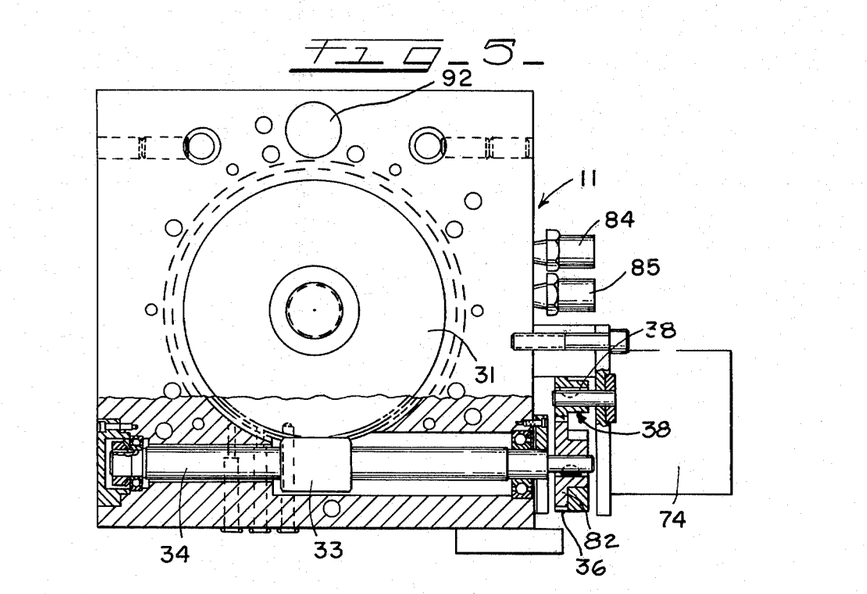
FIG. 5 is a top plan view of the turret base taken generally along the lines 5—5 of FIG. 2 with some of the parts of the base broken away to show underlying details of structure.

A worm gear 31 is disposed between a pair of thrust bearings 32 and is keyed to the shaft 27 by means of a key 30 disposed in an elongated key slot 30a. The worm gear 31 is rotated by means of a worm 33 fixed on a worm shaft 34. As shown in FIG. 5, the worm shaft 34 is journaled in bearings and one end thereof extends outwardly of the plate 17 and has a pinion gear 36 keyed thereto. The pinion gear 36 meshes with a gear 38 of a hydraulic motor 74 which is periodically actuated as more fully to be explained hereinafter.

Figure 1:
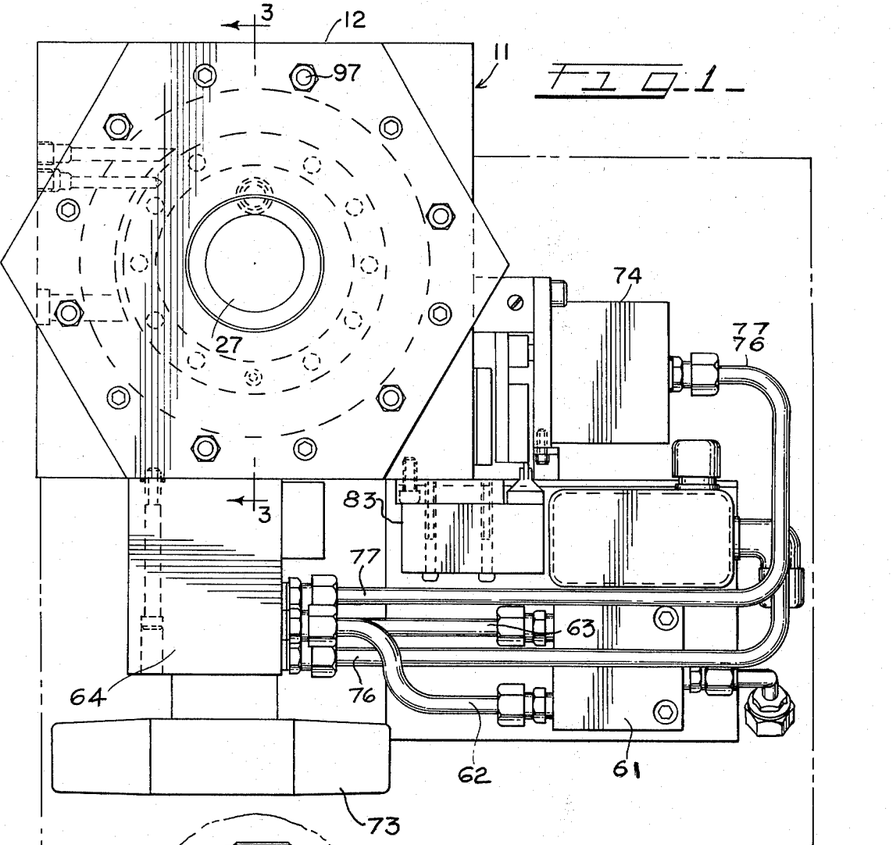
FIG. 1 is a top plan view of the automatic tool turret embodying the structure of the present invention.
Figure 2:
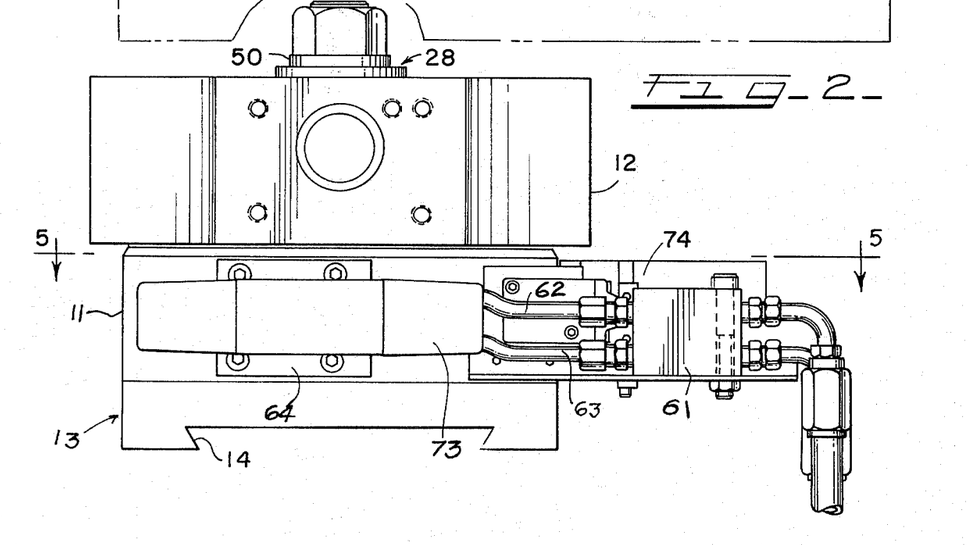
FIG. 2 is a front elevational view of the tool turret.
Figure 3:
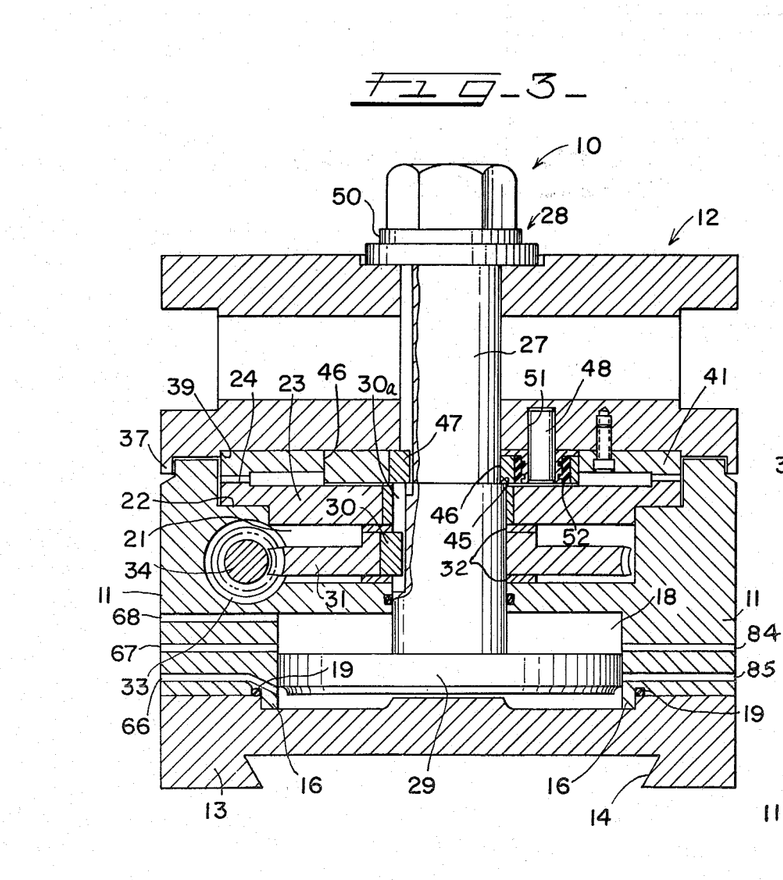
FIG. 3 is an elevational cross sectional view of the tool turret taken generally along the lines 3—3 of FIG. 1 and showing the turret head clutched to the base.
Figure 4:
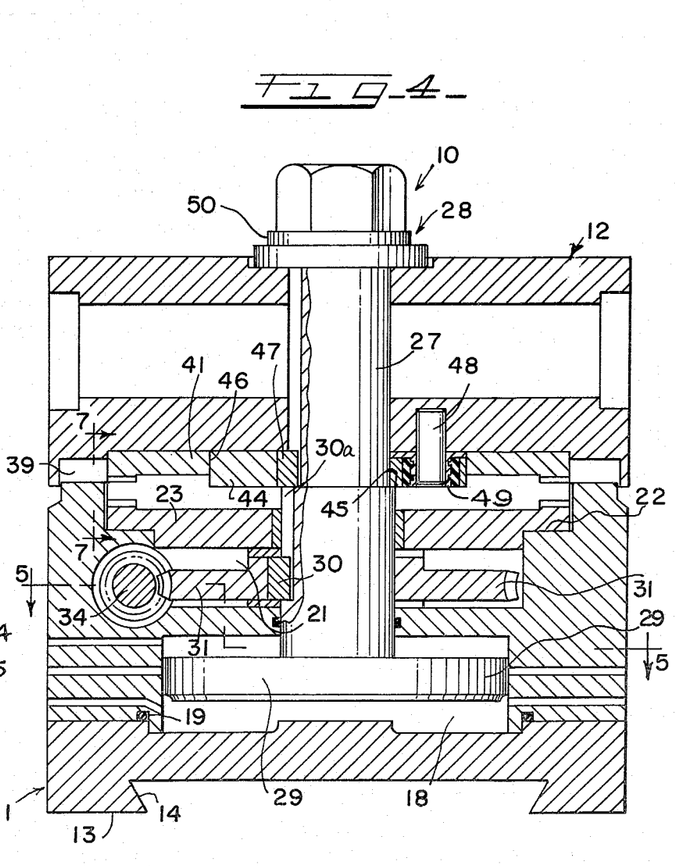
FIG. 4 is a view similar to FIG. 3 but showing the turret head in the unclutched position.

The turret head 12 as shown in FIGS. 1-4 is made from a metal block and includes a peripheral groove in which tools are angularly spaced and clamped. The head 12 includes a peripheral lip or skirt 37 which extends over the plate 17 of base 11 so as to provide in the nature of a labyrinth seal when the head is in the coupled and uncoupled positions as shown in FIGS. 3 and 4. The labyrinth seal prevents chips or debris from gaining access to the clutching faces.

Seated within a recess 39 and fixed to the head 12 as by means of countersunk screws is a second annular clutch plate 41. An annular clutch surface 42 is provided adjacent the periphery of the clutch plate 41. The clutch surface 42 is similar to the clutch surface 24 and includes a plurality of angularly spaced and radially extending teeth 43 which mesh between the teeth 26.

A driver plate 44 is supported on a shoulder 45 formed on the shaft 27 and in the axial opening 46 of the annular clutch plate 41 and is keyed to the shaft 27 for rotation therewith by means of a key 47. A nut and washer arrangement 50 threaded on the end of the shaft 27 serves to fasten the head 12 on the shaft 27 for vertical movement therewith. A driver pin 48 is slidably seated at one end in a bushing 49 disposed in a rubber sleeve 52. The other end of the driver pin 48 is seated in opening 51 and serves to drive or turn the head 12. This structure makes it possible to easily separate and remove the head 12 from the driver plate 44 so that a different head may be attached.

Referring now to FIG. 8 there is schematically shown a system 53 for actuating the turret head 12 from the clutched position shown in FIG. 3 to the unclutched position shown in FIG. 4. In the unclutched position the head 12 may be selectively rotated in increments of 30° angles in either direction from between about 30° to 270°. The amount of angular turning is controlled by a numerical control system, not shown.

The actuating system includes a hydraulic fluid supply assembly 54 which may be conveniently located inside the tailstock of the lathe on which the turret 10 is used. The hydraulic fluid supply assembly 54 includes a supply tank 56 containing a hydraulic fluid such as oil or the like. The hydraulic fluid from the supply tank 56 is circulated through the system by means of a pump 57 to a clamp-unclamp solenoid 58. A fluid pressure actuated switch 55 is disposed in the line between the clamp-unclamp solenoid 58 and the pump 57 and serves as an emergency stop circuit when the pressure is below a predetermined value. Fluid flows from the pump 57 to a double pilot operated check valve assembly 61 located at the turret 10. The check valve assembly 61 serves to maintain the turret head 12 in clamping or clutching engagement with the base 11 in the event of a power failure during the period in which the head is in a machining mode.

The check valve 61 is connected by way of lines 62 and 63 to a manifold block 64 having passages or ports 66, 67 and 68. The ports 68 and 67 are connected to the line 62 and located to enter the upper half of the piston chamber 18. A check valve 69 is located in the port 68. The port 66 is connected to the line 63 and is located to enter the lower half of the piston chamber 18.

Upon command from the numerical control (not shown) the solenoid 58 is shifted so that the fluid under pressure flows through the line 63 and port 66 to the lower half of the chamber 18. This causes the piston 29 to be raised and thereby the head 12.

At the same time hydraulic fluid flows from the chamber above the piston 29 through the port 67 and into line 62 until the piston 29 covers the port 67. Fluid under pressure than remains above the piston 29 because flow through the port 68 is prevented by the check valve 69. The piston is thus hydrostatically supported in the chamber 18.

In the raised position the coupling or clutching surfaces 24 and 42 are out of engagement so that the turret head 12 is free to be angularly indexed. The head 12 is retained in this raised position by means of the pressure forces acting on the piston 29.

The index circuit for rotating the head 12 includes lines 71 and 72 connected between the lines 63 and 62 respectively and to an index solenoid 73. When activated upon command from the numerical control as more fully to be explained hereinafter, the flow through the solenoid 73 is such that an hydraulic motor 74 connected between lines 76 and 77 is caused to rotate. The rotation may be either clockwise or counterclockwise. Disposed in the lines 71 and 72 between the indexing solenoid 73 and the motor 74 is an adjustable double flow control valve 78. The flow control valve 78 includes a pair of adjusting screws 79 and 81 which control the flow rate through the lines 76 and 77 and thereby the rate of rotation of the motor 74.

The motor 74 drives the worm shaft 34 and thereby the worm gear 31 to rotate the turret head 12. Each rotation of the worm shaft 34 is sensed by means of a cam 82 fixed for rotation therewith. The cam 82 actuates a limit switch 83 to generate a signal which is transmitted to the numerical control. When the number of signals at the numerical control corresponds to the desired angular turning of the head 12 to position a tool in a work performing position or operational mode, the index solenoid 73 is deenergized and the motor 74 stops rotating.

At this time the numerical control is operative to energize the solenoid 58 to cause a fluid flow past the check valve 69 through the port 68 so that the piston is lowered past the port 67. In this manner the head is moved so that the clutch faces 24 and 42 are clamped in meshing or clutching engagement.

Located on one side of the piston chamber 18 are a pair of ports 84 and 85 which are, respectively, connected to pressure switches 86 and 87. The port 85 is located to transmit the pressure of the fluid to the pressure switch 86 when the piston and the head are in the unclamped or uncoupled position. The pressure switch 86 when thus actuated transmits a signal to the numerical control for energizing the index solenoid 73 as above described to allow turning of the turret head 12. The port 84 is located to transmit fluid to the pressure switch 87 to indicate when the turret head 12 is in the clamped position and to transmit a signal to the numerical control to perform an operation on the work piece.

Figure 6:
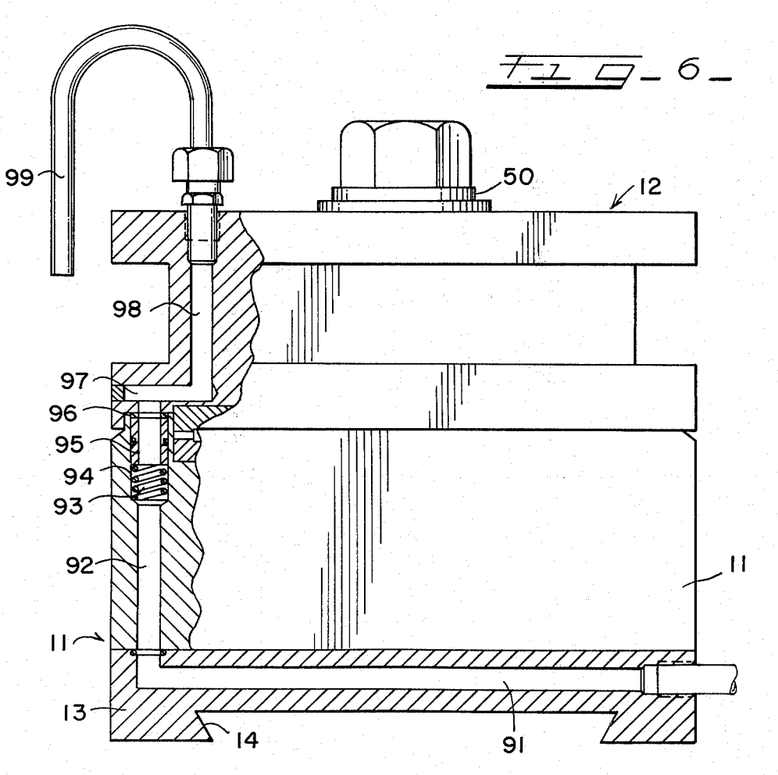
FIG. 6 is a front elevational view of the turret with some of the parts broken away to show underlying details of the coolant passages.

A coolant system is provided for providing coolant during the work performing cycle. The coolant system includes a passage 91 having a vertical passage 92 which terminates in an enlarged port 93. A compression spring 94 is seated in the port 93 and raises a poppet or sleeve 95 upwardly having an O-ring 96 seated in its upper end into engagement with the underside of the base of the turret head 12. The turret head 12 includes a plurality of angularly spaced ports 97 which when the head 12 is turned are alignable with the poppet 95. When the poppet 95 is aligned with one of the ports 97 coolant flows therethrough into a passage 98 and a tube 99 which is located so that the coolant flows over the tool and work piece at the work performing station.

What is claimed is:
1. An automatic turret tool holder comprising:
a base having a base clutching surface,
a tool carrying head mounted at said base and having a head clutching surface complementary to said base clutching surface,
cylinder means formed at one of said base and said head, piston means movably disposed in said cylinder means, said piston means being attached to and movable with the other of said base and head such that relative movement of said cylinder means and piston means effects relative movement of said base and head between a piston clutched position with said head and base clutching surfaces engaged with one another to prevent relative rotation of said base and head and a piston unclutched position with said head and base clutching surfaces out of engagement with one another to permit relative rotation of said base and head, first, second, and third fluid ports opening into said cylinder means at positions spaced successively from one another in the direction of relative movement of said piston means and cylinder means, said first and third fluid ports opening to respective first and second pressure spaces at opposite sides of said piston means for all positions of said piston means, said second fluid port being disposed intermediate said first and third fluid ports and opening to said first pressure space when said piston means is in said piston unclutched position and being closed by said piston means when in said piston clutched position, one-way check valve means in a line leading from said first fluid port which opens in a direction corresponding to flow through said first fluid port to said first pressure space and closes in the opposite fluid flow direction, first actuating fluid control means for supplying fluid under pressure to said third fluid port to force said piston means toward the unclutched position with initial movement of said piston means effecting fluid exhaust from the first pressure space through said second fluid port until a predetermined movement of said piston means closes said second fluid port at which point pressure is built up in said first pressure space and said piston means is held in the unclutched position by fluid pressure in both said first and second pressure spaces, said fluid pressure at said first and second pressure surfaces forming a fluid bearing which permits indexing rotation of said base and head with respect to one another.

2. A tool holder according to claim 1, further comprising second actuating fluid control means for supplying fluid under pressure to said first fluid port through said one-way check valve means while exhausting fluid from said second pressure space through said third fluid port, whereby said piston means is moved to said piston clutched position.

3. A tool holder according to claim 2, further comprising indexing means for rotatably indexing said head with respect to said base when said piston means is in said piston unclutched position.

4. A tool holder according to claim 3, wherein said indexing means includes fluid powered means and indexing fluid control means for controlling flow of fluid for powering said fluid powered means.

5. A tool holder according to claim 4, wherein said indexing fluid control means includes indexing control valve means for directly controlling flow of fluid to and from said fluid powered means, said indexing control valve means being spaced from and separate from the piston means and cylinder means.

6. A tool holder according to claim 5, wherein said first and second actuating fluid control means include actuating fluid line means leading to and from said fluid ports, and wherein further fluid line means leading to and from said indexing control valve means are fluidly connected to said actuating fluid line means at positions spaced from said cylinder means.

7. A tool holder according to claim 6, wherein said indexing fluid control means includes a pair of indexing fluid control line means connecting said fluid powered means with said indexing control valve means, said indexing control valve means including means for directly controlling fluid supply and exhaust between said further fluid line means and said indexing fluid control line means.

8. A tool holder according to claim 7, wherein a fourth fluid port opens into said cylinder means at a position in the direction of movement of the piston means intermediate the second and third fluid ports, said fourth fluid port being opened by said piston means when said piston means has moved a predetermined distance from said unclutched position, and wherein said fourth fluid port is communicated with an index actuation switch, said index actuation switch including means to actuate said indexing control valve means to start an indexing operation in response to opening of said fourth fluid port by said piston means.

9. A tool holder according to claim 8, wherein a fifth fluid port opens into said cylinder means and communicates with a work initiation switch, said fifth fluid port being disposed to be open when said piston means is in its piston clutched position, said work initiation switch including means to actuate a working operation in response to closing of said fifth fluid port by said piston means.

10. A tool holder according to claim 3, wherein said cylinder means is formed in said base, wherein said piston means is attached to and movable with said head, and wherein said indexing means includes a hydraulic motor and a worm gear driven by said hydraulic motor.

11. A tool holder according to claim 10, wherein said base includes: a lower base plate which includes downwardly opening groove means engageable with a tool slide of a machine tool, and an upper base plate detachably connected to said lower base plate, said cylinder means being formed by a downwardly open recess in said upper base plate and a facing portion of said lower base plate.

12. A tool holder according to claim 11, wherein said piston means includes an enlarged piston head portion slidable in said cylinder means and a shaft portion of smaller diameter than said piston head portion which extends upwardly from said piston head portion through said upper base plate, said head being detachably attached to said shaft portion.

13. A tool holder according to claim 1, wherein said piston means is a solid piston with no communication therethrough of fluid between the first and second pressure spaces.

14. The invention as defined in claim 1 wherein said head clutching surface comprises a plurality of angularly spaced ground teeth of substantially rectangular cross section.

15. The invention as defined in claim 1 wherein said head includes a peripheral skirt overlying the base in the clutched and unclutched positions thereof.

16. The invention as defined in claim 1 wherein a single cooling fluid passage means is provided in said base, a plurality of angularly spaced passages are provided in said head alignable with said single fluid passage in said base, a resiliently biased sleeve poppet is provided in said single fluid passage in continuous engagement with said head between the clutched and unclutched positions thereof.

17. An automatic turret tool holder comprising:
a base having a base clutching surface,
a tool carrying head mounted at said base and having a head clutching surface complementary to said base clutching surface,
cylinder means formed at one of said base and said head,
piston means movably disposed in said cylinder means, said piston means being attached to and movable with the other of said base and head such that relative movement of said cylinder means and piston means effects relative movement of said base and head between a piston clutched position with said head and base clutching surfaces engaged with one another to prevent relative rotation of said base and head and a piston unclutched position with said head and base clutching surfaces out of engagement with one another to permit relative rotation of said base and head,
said cylinder means being provided with first and second pressured faces at respective oppositely facing pressure surfaces of said piston means,
actuating fluid control means for selectively pressurizing said pressure spaces to move said piston means between said piston clutched and unclutched positions with pressure build up in both pressure spaces rotatably supporting said piston means and head when in said piston unclutched position,
and indexing means for rotatably indexing said head with respect to said base when said piston means is in said piston unclutched position, said indexing means including fluid powered means and indexing fluid control means for controlling flow of fluid for powering said fluid powered means,
wherein said indexing fluid control means includes indexing control valve means for directly controlling flow of fluid to and from said fluid powered means, said indexing control valve means being spaced from and separate from the piston means and cylinder means,
wherein said indexing fluid control means includes a pair of indexing fluid control line means connecting said fluid powered means with said indexing control valve means, said indexing control valve means including means for directly controlling fluid supply and exhaust between said further fluid line means and said indexing fluid control line means.

18. A tool holder according to claim 17, wherein said cylinder means is formed in said base, wherein said piston means is attached to and movable with said head, and wherein said indexing means includes a hydraulic motor and a worm gear driven by said hydraulic motor.

19. A tool holder according to claim 17, wherein said base includes: a lower base plate which includes downwardly opening groove means engageable with a tool slide of a machine tool, and an upper base plate detachably connected to said lower base plate, said cylinder means being formed by a downwardly open recess in said upper base plate and a facing portion of said lower base plate.

20. A tool holder according to claim 17, wherein an index signal fluid port opens into said cylinder means, said index signal fluid port means being closed by said piston means when said piston means is in said piston clutched position and being opened by said piston means after a predetermined movement of said piston means toward its unclutched position, and wherein said index signal fluid port is communicated with an index actuation switch, said index actuation switch including means to actuate said indexing control valve means to start an indexing operation in response to opening of said index signal fluid port by said piston means.

21. An automatic turret tool holder comprising:
a base having a base clutching surface,
a tool carrying head mounted at said base and having a head clutching surface complementary to said base clutching surface,
cylinder means formed at one of said base and said head,
piston means movably disposed in said cylinder means, said piston means being attached to and movable with the other of said base and head such that relative movement of said cylinder means and piston means effects relative movement of said base and head between a piston clutched position with said head and base clutching surfaces engaged with one another to prevent relative rotation of said base and head and a piston unclutched position with said head and base clutching surfaces out of engagement with one another to permit relative rotation of said base and head,
said cylinder means being provided with first and second pressured faces at respective oppositely facing pressure surfaces of said piston means,
actuating fluid control means for selectively pressurizing said pressure spaced to move said piston means between said piston clutched and unclutched positions with pressure build up in both pressure spaced rotatably supporting said piston means and head when in said piston unclutched position,
and indexing means for rotatably indexing said head with respect to said base when said piston means is in said piston unclutched position, said indexing means including fluid powered means and indexing fluid control means for controlling flow of fluid for powering said fluid powered means,
wherein said indexing fluid control means includes indexing control valve means for directly controlling flow of fluid to and from said fluid powered means, said indexing control valve means being spaced from and separate from the piston means and cylinder means,
wherein a working signal fluid port opens into said cylinder means, said working signal fluid port being open when said piston means is in its clutched position and being closed by said piston means when in its unclutched position, said working signal fluid port being communicated with a work initiation switch which includes means to actuate a working cycle by a machine using said tool holder in response to opening of said working signal fluid port.

22. A tool holder according to claim 21, wherein said actuating fluid control means includes actuating fluid line means leading to and from said pressure spaces, and wherein further fluid line means are provided which lead to and from said indexing control valve means, said further fluid line means being connected directly to said actuating fluid line means at positions spaced from said cylinder means.

23. An automatic turret tool holder comprising:
a base having a base clutching surface,
a tool carrying head mounted at said base and having a head clutching surface complementary to said base clutching surface,
cylinder means formed at one of said base and said head,
and piston means movably disposed in said cylinder means, said piston means being attached to and movable with the other of said base and head such that relative movement of said cylinder means and piston means effects relative movement of said base and head between a piston clutched position with said head and base clutching surfaces engaged with one another to prevent relative rotation of said base and head and a piston unclutched position with said head and base clutching surfaces out of engagement with one another to permit relative rotation of said base and head,
wherein said base includes: a lower base plate which includes downwardly opening groove means engageable with a tool slide of a machine tool, and an upper base plate detachably connected to said lower base plate, said cylinder means being formed by a downwardly open recess in said upper base plate and a facing portion of said lower base plate.

24. A tool holder according to claim 23, wherein said piston means includes an enlarged piston head portion slidable in said cylinder means and a shaft portion of smaller diameter than said piston head portion which extends upwardly from said piston head portion through said upper base plate, said head being detachably attached to said shaft portion.

25. A tool holder according to claim 24, wherein the maximum diametric dimension of said piston means is at said piston head, wherein said head is clamped between a shoulder provided on said shaft portion and a detachable nut and washer which surrounds said shaft portion at one end thereof.

26. A tool holder according to claim 25, wherein said piston means is dimensioned to accommodate removal thereof in the direction toward said lower base plate when said nut and washer are removed.

27. A tool holder according to claim 23, further comprising indexing means for rotatably indexing said head with respect to said base when said piston means is in said piston unclutched position, and wherein said indexing means includes a worm shaft in meshing engagement with a worm gear which surrounds said piston shaft, said upper base plate including an upwardly facing recess for accommodating said worm gear as well as a further opening accommodating said worm shaft.

28. A tool holder according to claim 26, further comprising indexing means for rotatably indexing said head with respect to said base when said piston means is in said piston unclutched position, and wherein said indexing means includes a worm shaft in meshing engagement with a worm gear which surrounds said piston shaft, said upper base plate including an upwardly facing recess for accommodating said worm gear as well as a further opening accommodating said worm shaft.

29. A tool holder according to claim 28, wherein said base clutching surfaces faces upwardly and is disposed on a base clutch plate separate from and supported at said upper base plate at a position above said worm gear.

30. A tool holder according to claim 29, wherein said upwardly facing recess of said upper base plate includes an uppermost maximum diameter portion for accommodating said base clutch plate and a lower smaller diameter position for accommodating said worm gear, said base clutch plate having a greater diameter than said worm gear, whereby disassembly of parts of the tool holder is readily accommodated.

31. A tool holder according to claim 30, wherein a drive plate in driving engagement with said worm gear is provided, said drive plate being drivingly connected to said head by driver pins mounted in cushioned apertures of said drive plate.

32. A tool holder according to claim 31, wherein said head clutching surface is provided on an annular head clutch plate which is disposed above said base clutch plate and surrounds said drive plate.

33. An automatic turret tool holder comprising:
a base having a base clutching surface,
a tool carrying head mounted at said base and having a head clutching surface complementary to said base clutching surface,
cylinder means formed at one of said base and said head,
piston means movably disposed in said cylinder means, said piston means being attached to and movable with the other of said base and head such that relative movement of said cylinder means and piston means effects relative movement of said base and head between a piston clutched position with said head and base clutching surfaces engaged with one another to prevent relative rotation of said base and head and a piston unclutched position with said head and base clutching surfaces out of engagement with one another to permit relative rotation of said base and head,
said cylinder means being provided with first and second pressure faces at respective oppositely facing pressure surfaces of said piston means,
actuating fluid control means for selectively pressurizing said pressure spaced to move said piston means between said piston clutched and unclutched positions with pressure build up in both pressure spaced rotatably supporting said piston means, and head when in said piston unclutched position,
and indexing means for rotatably indexing said head with respect to said base when said piston means is in said piston unclutched position, said indexing means including fluid powered means and indexing fluid control means for controlling flow of fluid for powering said fluid powered means,
wherein said indexing fluid control means includes indexing control valve means for directly controlling flow of fluid to and from said fluid powered means, said indexing control valve means being spaced from and separate from the piston means and cylinder means,
wherein an index signal fluid port opens into said cylinder means, said index signal fluid port means being closed by said piston means when said piston means is in said piston clutched position and being opened by said piston means after a predetermined movement of said piston means toward its unclutched position, and wherein said index signal fluid port is communicated with an index actuation switch, said index actuation switch including means to actuate said indexing control valve means to start an indexing operation in response to opening of said index signal fluid port by said piston means.

34. A tool holder according to claim 33, wherein a working signal fluid port opens into said cylinder means, said working signal fluid port being open when said piston means is in its clutched position and being closed by said piston means when in the unclutched position, said working signal fluid port being communicated with a work initiation switch which includes means to actuate a working cycle by a machine using said tool holder in response to opening of said working signal fluid port.

35. A tool holder according to claim 29, wherein said cylinder means is formed in said base, wherein said piston means is attached to and movable with said head, and wherein said indexing means includes a hydraulic motor and a worm gear driven by said hydraulic motor.

* * * * *